(12) United States Patent
Detter et al.

(10) Patent No.: US 6,669,426 B1
(45) Date of Patent: Dec. 30, 2003

(54) TREE FASTENER

(75) Inventors: Gary C. Detter, Berlin Center, OH (US); David R. Peterson, Aurora, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/170,888

(22) Filed: Jun. 13, 2002

(51) Int. Cl.[7] ............................................... F16B 19/00
(52) U.S. Cl. ..................... 411/510; 411/908; 411/913
(58) Field of Search ................................ 411/508, 509, 411/510, 913, 908

(56) References Cited

U.S. PATENT DOCUMENTS

| | | | |
|---|---|---|---|
| 4,392,278 A | * | 7/1983 | Mugglestone ........... 411/510 X |
| 4,396,329 A | | 8/1983 | Wollar |
| 4,402,641 A | * | 9/1983 | Arff ............................. 411/510 |
| 4,728,238 A | | 3/1988 | Chisholm et al. |
| 4,762,437 A | * | 8/1988 | Mitomi .................. 411/510 X |
| 5,039,267 A | | 8/1991 | Wollar |
| 5,306,098 A | | 4/1994 | Lewis |
| 5,373,611 A | | 12/1994 | Murata |
| 5,393,185 A | * | 2/1995 | Duffy, Jr. ..................... 411/510 |
| 5,468,108 A | | 11/1995 | Sullivan et al. |
| 5,672,038 A | | 9/1997 | Eaton |
| 5,718,025 A | * | 2/1998 | Courtin .................. 411/510 X |
| 5,907,891 A | | 6/1999 | Meyer |

* cited by examiner

Primary Examiner—Neill Wilson
(74) Attorney, Agent, or Firm—David P. Wood

(57) ABSTRACT

A fastener having a head and a cylindrical shank, the shank having a first set of opposed wings extending from two opposed longitudinally extending segments and a second set of opposed wings extending from the two other opposed longitudinally extending segments. Wings in opposing segments are identical. Wings in the first set have a larger radial diameter than wings in the second set. Wings in adjacent segments are offset a distance longitudinally. There is a longitudinally extending spacing between one radial edge of each wing in the first set and one radial edge of each wing in the second set. Each of the wings in the second set has a flattened portion on a distal edge that extends to a radial edge. The fastener is particularly useful for maintaining a high ratio of disengage force to engage force over a range of aperture sizes, shapes, and panel thicknesses.

21 Claims, 2 Drawing Sheets

TREE FASTENER

TECHNICAL FIELD

The present invention relates to tree fasteners useful for fastening items to sheet metal, panels, and similar structures.

BACKGROUND OF THE INVENTION

Tree fasteners with radially extending wings or branches for insertion into apertures in sheet metal, panels, and other similar structures are known in the prior art. Typically, tree fasteners are arranged to be driven axially into preformed openings in a sheet metal or other panel and to engage the surface near the opening on the opposing side of the structure by virtue of radially extending flexible tabs or wing-like members. Fasteners of this variety are often referred to as fir tree fasteners because of the shape of the fastener. Fasteners of this type have flexible tabs or wing-like members that extend outwardly from a shank as branches do from the trunk of a tree. They are also sometimes referred to as plastic drive fasteners.

A tree fastener with split wings is described in Meyer, U.S. Pat. No. 5,907,891. A plastic drive fastener with wings designed to increase the force required for removal from apertures is described in Chisholm et al., U.S. Pat. No. 4,728,238. A plastic drive fastener having axially offset wing elements is described in Lewis, U.S. Pat. No. 5,306,098.

A fir tree fastener may be used to secure one panel to another panel. Additionally, a fir tree fastener may be an integral part of a cable tie that is used to secure a wiring harness to an automotive panel. There are many other possible applications.

For many applications it is desirable to have a low insertion force when installing the fastener into an aperture of a structure and to have a high disengage force for removal. It is advantageous to many manufacturers, suppliers, and users for the fastener to perform over a broad range of aperture sizes, shapes, and panel thicknesses. It is also desirable in applications subject to vibration, such as machinery, or vehicles of all kinds, to have the fastener fit snugly into an aperture to resist the vibration and minimize rattling noise.

Tree fasteners known in the prior art generally provide acceptable performance characteristics when applied to a narrow range of aperture sizes, shapes, and panel thicknesses. Outside of this range of application, performance, such as the force required to engage and/or disengage the fastener, can significantly change.

There are no universally accepted standards for aperture size or shape or panel thickness. Fastener producers and merchants must carry a large variety of fasteners and large number of fastener part numbers to accommodate the wide range of applications. Significant costs are incurred by manufacturers, merchants, and users as a result of having to manage each additional part number. These costs include, but are not limited to, costs for designing, producing, inventorying, tracking, and accounting for each additional part number.

SUMMARY OF THE INVENTION

The present invention relates to a universal tree fastener that can fit and function over a range of aperture diameter, shape, and thickness applications.

These and other advantages are achieved by providing a tree fastener wherein a cylindrical shank vertically extends from a base and wings radially extend from the shank in longitudinally extending segments or columns. The wings extending from two of the opposing segments are smaller than wings extending from two other opposing segments. Multiple opposing sets of wings with different radial dimensions enable the present invention to function over a broad range of aperture sizes and shapes.

Advantages are also achieved by providing a fastener wherein wings extend from the shank in longitudinally extending segments or columns. The invention allows free flexing of the wings and prevents wing interference as the fastener is inserted into an aperture of a structure.

Furthermore, the invention enables a fastener to be installed with relatively low force while maintaining a high disengage force, and a high ratio between disengage force to engage force over a range of aperture sizes and shapes and panel thicknesses. The fastener also provides resistance to vibration and rattling over a range of aperture sizes and shapes and panel thicknesses.

BRIEF DESCRIPTION OF THE DRAWINGS

The present invention will now be described, by way of example, with reference to the accompanying drawings, in which.

DETAILED DESCRIPTION OF THE INVENTION

Figure 1:
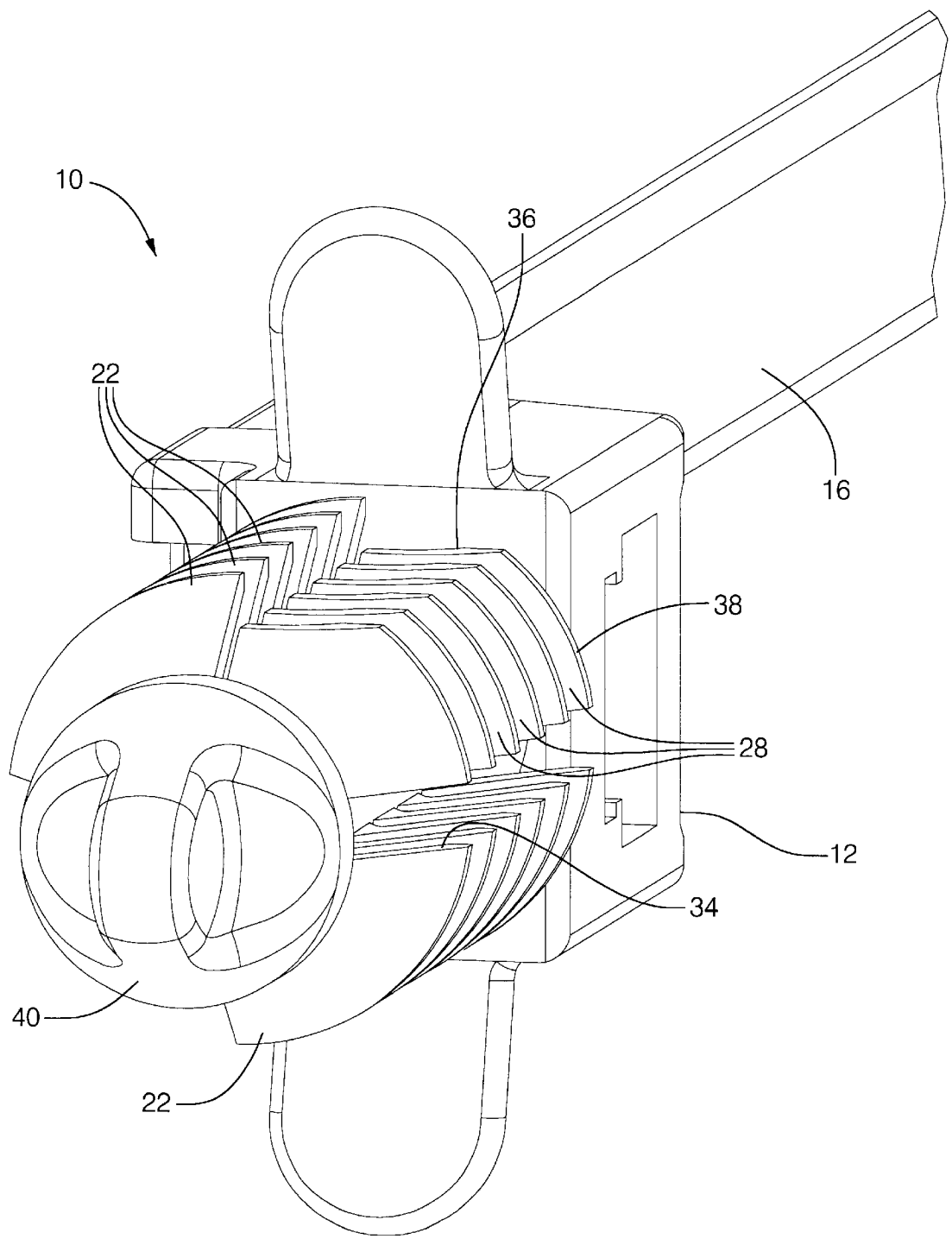
FIG. 1 is a perspective view of the fastener of the present invention.
Figure 2:
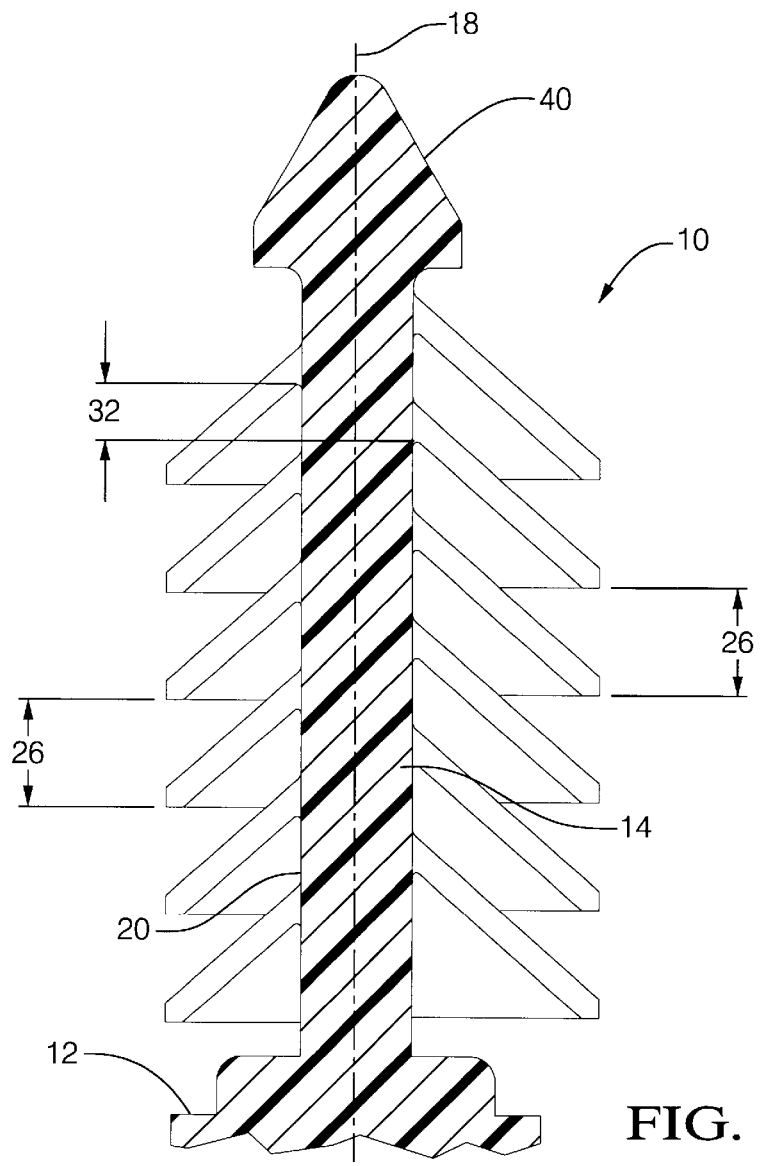
FIG. 2 is a cross-section view of the fastener of the present invention taken along line 2—2 viewing in the direction of the arrows in FIG. 3.
Figure 3:
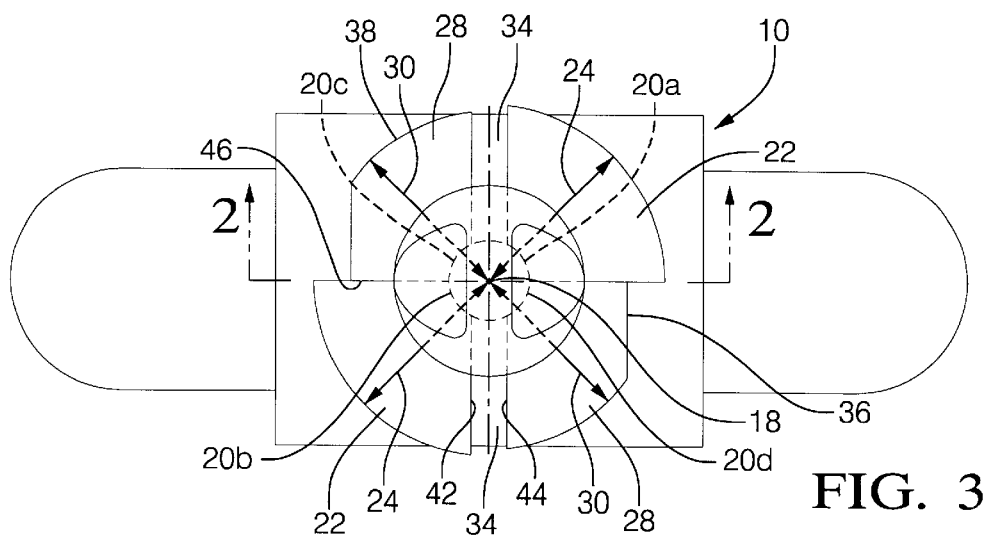
FIG. 3 is a top plan view of the fastener of the present invention.

Referring to the figures wherein like numerals refer to like elements throughout the several views, FIG. 1 is a perspective view of the fastener 10 of the present invention. The fastener 10 is formed of a molded plastic or a similar material. As shown in FIGS. 1–3, the fastener 10 includes a base 12 and a shank 14 (shown in FIG. 2). While the present invention shows the base 12 as being an integral part of a cable tie 16, it should be recognized by those skilled in the art that this is merely one example of a base form. Such a fastener, as contemplated by the present invention, can have a base comprised of a single head such as a dome, or it may include a multiplicity of axially spaced heads of the type normally used to fasten trim panels to automotive door interiors, not shown.

As shown in FIGS. 2 and 3, the shank 14 is generally cylindrical in shape, having a longitudinal axis 18 extending vertically away from the base 12 and a longitudinal surface 20 extending radially from the longitudinal axis 18. It will be appreciated that the shank can have other shapes. For example, the cross-section may also be oval, elliptical, or polygonal. The longitudinal surface 20 is comprised of four diametrically opposing longitudinally extending segments 20a,b,c,d, from which four corresponding columns of wings extend, each segment 20a,b,c,d extending the length of the longitudinal surface 20. It will be appreciated that the advantages of the present invention may also be achieved with more or less than four columns of wings.

Extending radially outward from each of a first pair of opposing segments 20a, 20b and angled toward the base 12 are a plurality of axially spaced flexible, resilient first wings 22 extending a first radial distance 24 from the longitudinal axis 18 and having an axial spacing 26 between adjacent first wings 22. Extending radially outward from each of the second pair of opposing segments 20c, 20d and angled toward the base 12 are a plurality of axially spaced flexible, resilient second wings 28 extending a second radial distance 30 from the longitudinal axis 18 that is less than the first radial distance 24 and having an axial spacing 26 between adjacent second wings 28.

Each of the first wings 22 are axially offset an axial offset distance 32 relative to each of the corresponding second wings 28. In the preferred embodiment the axial offset distance 32 is half of the axial spacing 26. Two opposing slots 34a,b extend longitudinally outside the longitudinal surface 20 of the shank 14 between adjacent sets of first and second wings 22,28. This provides a gap between a radial edge 42 of each first wing 22 and a first radial edge 44 of each corresponding second wing 28. Each of the second wings 28 has a distal edge 38 that is eccentric with respect to the longitudinal axis 18 of the shank 14. In the preferred embodiment, each of the second wings 28 has a flattened portion 36 on the distal edge 38 of the second wing 28 that extends to a second radial edge 46 of the second wing 28.

The nose portion 40 is illustrated in the present embodiment as a rounded arrow shaped member that extends vertically from the end of the shank 14.

It will be appreciated that the advantages of the fastener of the present invention can also be achieved with variations of the design described above. For example, where two identical opposing wings are shown with offset adjacent wings, the two opposing wings can essentially be replaced by one wing having two large slots. There can also be variations in the slots 34 and flattened portion 36 on the distal edge 38 of the second wings 28 that still permit free flexing of the wings and prevent wing interference as a fastener is inserted into an aperture of a structure. In addition, some of the advantages may be achieved if the features described above are embodied on a subset of the fastener. For example, advantages can be achieved if features described above are embodied in an axially extending span of the shank and the wings that extend therefrom. The axially extending span may, for example, extend the distance represented by an axial spacing 26 or a plurality of axial spacings.

This invention has been described with reference to the preferred embodiment and modifications thereto. Further modifications and alterations may occur to others upon reading and understanding the specification. It is intended to include all such modifications and alterations insofar as they come within the scope of the invention. For example, one skilled in the art would realize that where a rounded arrow shaped nose portion 40 is illustrated, the nose portion can also be rounded, pointed, or some other configuration. The shank 14 can also be blunt at the end.

Having thus described the invention, it is claimed:

1. A fastener comprising:
a shank, having an axis, extending from a base;
a first set of wings extending outward from said shank a first distance from said axis, said first set of wings extending from a first axially extending portion of said shank;
a second set of wings extending outward from said shank a second distance from said axis, said second set of wings extending from a second axially extending portion of said shank;
wherein said first distance being greater than said second distance and adjacent wings within each of said first and second axially extending portions being spaced a distance apart.

2. The fastener as in claim 1, wherein said shank is generally cylindrical.

3. A fastener comprising:
a shank, having an axis, extending from a base;
a first set of wings extending outward from said shank a first distance from said axis;
a second set of wings extending outward from said shank a second distance from said axis;
wherein said first distance being greater than said second distance and wherein at least one wing from said second set of wings has a flattened portion on a distal edge that extends to a radial edge.

4. A fastener comprising:
a shank, having a longitudinal axis, extending from a base; and
a plurality of wings extending outward from said shank, each of said wings having a distal edge, said distal edge on at least one of said wings being eccentric relative to said shank, said plurality of wings comprising a first and a second wing, said first wing extending further from said axis than said second wing.

5. The fastener as in claim 4 further comprising:
a slot extending axially between at least one pair of adjacent wings.

6. A fastener comprising:
a shank having a longitudinal axis extending vertically from a base;
a first set of wings extending outward a first radial distance from a first and a second longitudinal segment of said shank, adjacent wings within each of said first and second segments being spaced a distance apart; and
a second set of wings extending outward a second radial distance from a third and a fourth longitudinal segment of said shank, adjacent wings within each of said third and fourth segments being spaced a distance apart, said first radial distance being greater than said second radial distance.

7. The fastener as in claim 6 wherein:
each pair of said adjacent wings within each of said first and second segments being spaced generally an equal axial distance apart; and
each pair of said adjacent wings within each of said third and fourth segments being spaced generally an equal axial distance apart.

8. The fastener as in claim 7 wherein:
said first set of opposing wings is shifted axially from said second set of opposing wings.

9. The fastener as in claim 8 wherein:
a radial edge on at least one of said wings in said first set of opposing wings and a radial edge on at least one of said wings in said second set of opposing wings being spaced a circumferential distance apart.

10. The fastener as in claim 9 wherein:
each of said second wings from said second set of opposing wings having a flattened portion on a distal edge that extends to a radial edge.

11. The fastener as in claim 6 wherein:
said first set of opposing wings is shifted axially from said second set of opposing wings.

12. The fastener as in claim 6 wherein:
a radial edge on at least one of said wings in said first set of opposing wings and a radial edge on at least one of said wings in said second set of opposing wings being spaced a circumferential distance apart.

13. The fastener as in claim 6 wherein:
    each of said second wings from said second set of opposing wings having a flattened portion on a distal edge that extends to a radial edge.

14. The fastener as in claim 6 wherein said shank is generally cylindrical.

15. A fastener comprising:
    a shank, extending longitudinally from a base; and
    a plurality of wings extending outward from an axially extending span of said shank, wherein each of said wings extending from a first column of said axially extending span having a distal edge extending further away from said axis of said shank than a distal edge of each of said wings extending from a second column of said axially extending span.

16. The fastener as in claim 15 wherein each of said wings extending from said first column of said axially extending span are axially offset with respect to each of said wings extending from said second column of said axially extending span.

17. The fastener as in claim 15 wherein the distal edge on at least one of said plurality of wings extending outward from said axially extending span of said shank is eccentric with respect to said longitudinal axis.

18. The fastener as in claim 15 wherein each of said wings extending from said first column of said axially extending span are spaced a distance from each of said wings extending from said second column of said axially extending span.

19. A fastener comprising:
    a shank, having a longitudinal axis, extending from a base; and
    a plurality of wings extending outward from said shank, wherein at least one of said wings extending from a span of said shank having a distal edge extending a first distance from said axis of said shank, at least one of said wings extending from said span extending a second distance from said axis of said shank, said first distance being greater than said second distance.

20. The fastener as in claim 19 wherein said shank is generally cylindrical.

21. The fastener as in claim 20 wherein the distal edge on at least one of said plurality of wings extending outward from said shank is eccentric with respect to said longitudinal axis.

* * * * *